Dec. 3, 1946.  W. B. SHEAR  2,412,066
SHEARING APPARATUS
Filed Oct. 31, 1944   2 Sheets-Sheet 1

INVENTOR
W. B. SHEAR

BY *J. H. B. Whitfield*
ATTORNEY

Dec. 3, 1946. W. B. SHEAR 2,412,066
SHEARING APPARATUS
Filed Oct. 31, 1944 2 Sheets-Sheet 2

INVENTOR
W. B. SHEAR
BY
*J. H. B. Whitfield*
ATTORNEY

Patented Dec. 3, 1946

2,412,066

UNITED STATES PATENT OFFICE 2,412,066

SHEARING APPARATUS

Walter B. Shear, Newark, N. J., assignor to Western Electric Company, Incorporated, New York, N. Y., a corporation of New York Application October 31, 1944, Serial No. 561,198

4 Claims. (Cl. 164—29)

1

This invention relates to shearing apparatus, and more particularly to apparatus for shearing blueprints.

In manufacturing concerns, machine and tool drawings are usually made upon sheets of standard sizes. Furthermore, the blueprints or other reproductions of the drawings may be made so that a multiplicity of prints of drawings, all of the same size, may appear in one sheet of material, for example, blueprint paper.

An object of the invention is to provide a shearing apparatus which is simple in structure and highly efficient in operation to simultaneously shear a complete print from a material containing a plurality of prints.

With this and other objects in view, the invention comprises a shearing apparatus having shearing elements surrounding an area of a given contour, a companion member having slots to receive the shearing elements and means to cause relative movement of the shearing elements and the companion member to shear a portion from a material.

Other objects and advantages will be apparent from the following detailed description when considered in conjunction with the accompanying drawings, wherein Fig. 1 is a side elevational view of the apparatus, portions thereof being broken away;

Figure 1:
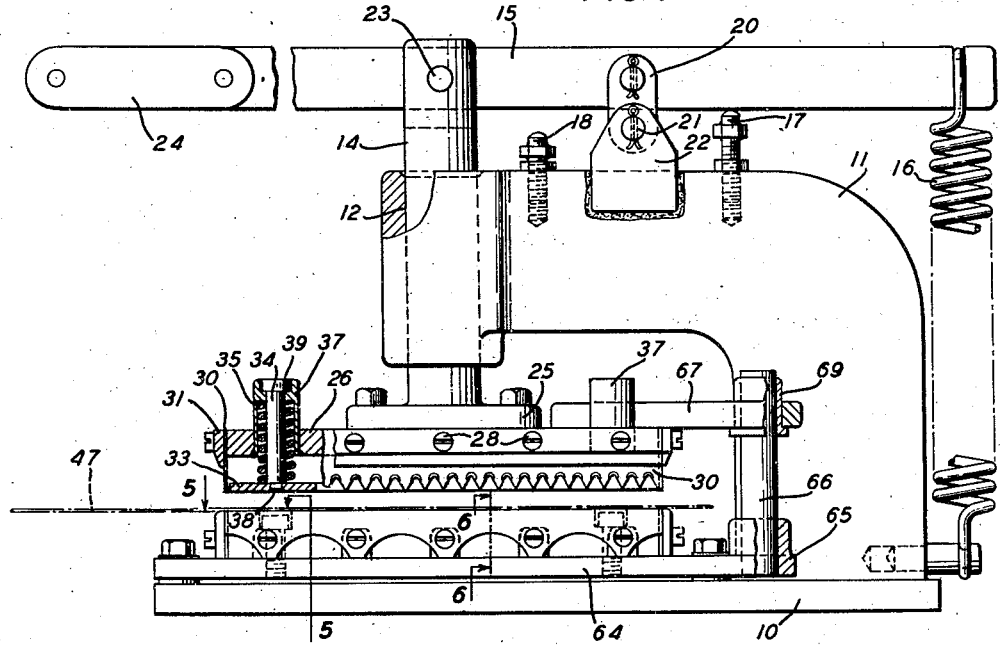
Figure 2:
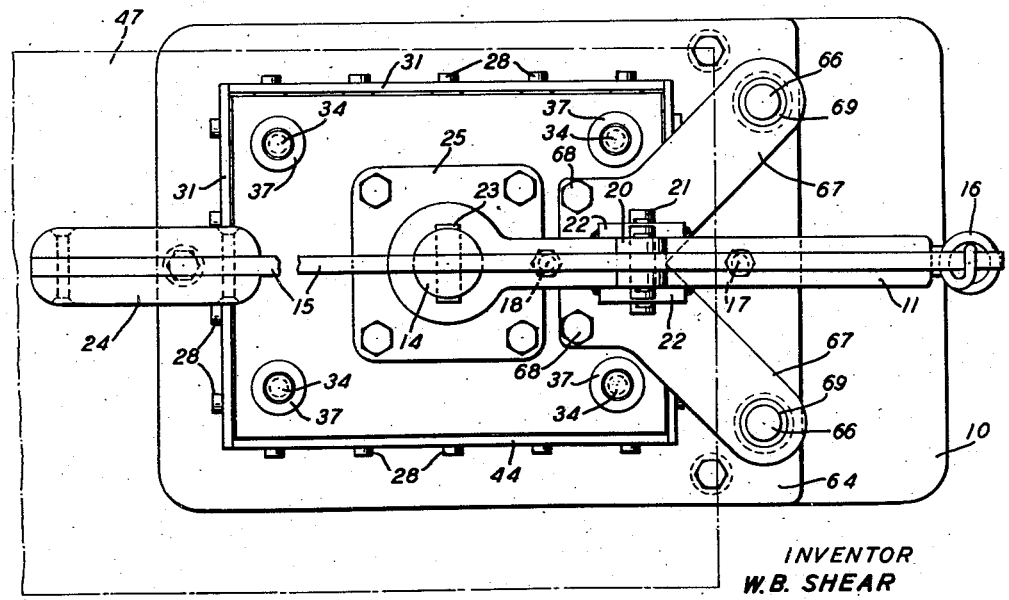
Fig. 2 is a top plan view of the apparatus.

Referring now to the drawings, attention is first directed to Figs. 1 and 2 which illustrate a supporting base 10 with an integral bracket portion 11 formed at its free end with a bearing 12 for a reciprocable ram or rod 14. The movement of the ram 14 is under the control of a lever 15 and a spring 16, the latter normally urging the ram upwardly a distance limited by a variable stop

2

17. The downward movement of the ram is controlled by a variable stop 18, these stops 17 and 18 being mounted in the bracket 11. The lever 15 is supported by a link 20, the link in turn being supported, pivotally, at 21 in lugs 22 which are fixed to the bracket 11. The purpose of the link 20 is to allow the necessary longitudinal movement of the lever 15 for imparting a truly vertical movement to the ram 14 through the pivotal connection 23. A handle 24 may be gripped by the operator to actuate the lever 15.

Figure 3:
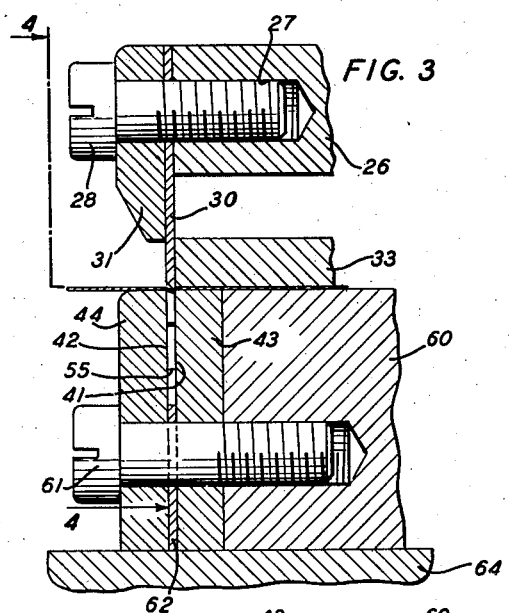
Fig. 3 is an enlarged fragmentary sectional view of a portion of the apparatus.

The lower end of the ram 14 is flared outwardly as at 25 to provide a support for a head 26. The head 26 is of the contour of the print or portion to be cut from the material. In the present instance, the head 26 is rectangular and is provided with a plurality of threaded apertures 27 (Fig. 3), for receiving mounting screws 28. Shearing elements 30 are provided for the four sides of the head 26 and are secured thereto through the aid of the screws 28 and holding strips 31. The holding strips 31 extend downwardly a given distance from the head to support the shearing elements 30 and add rigidity thereto.

A stripping element 33, which is substantially of the same contour as the head is positioned in the area surrounded by the shearing elements 30 and is freely movable therein under the control of plungers 34 and their controlling springs 35. There are four of the spring press plungers, one adjacent each corner of the head 26 and supported by their housings 37, the latter being fixed in apertures of the head as shown in Fig. 1. The lower ends of the plungers 34 are fixed to the stripper plate 33 as indicated at 38, while the upper ends of the plungers are provided with heads 39 to limit the normal position of the stripper plate causing its lower surface to lie in a plane with the lower edges of the shearing elements 30 or slightly therebeneath, if so desired.

Figure 4:
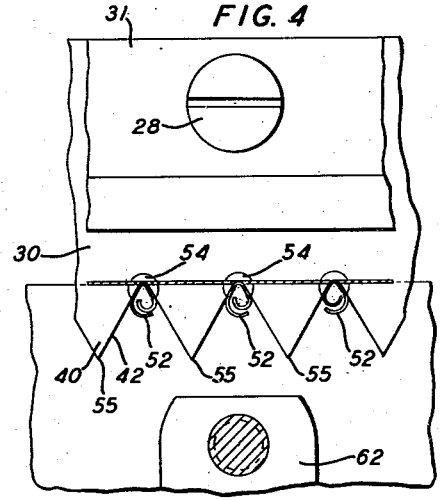
Fig. 4 is a fragmentary sectional view taken along the line 4—4 of Fig. 3.
Figure 5:
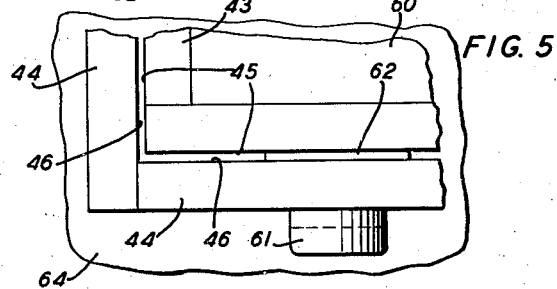
Fig. 5 is an enlarged fragmentary detailed view taken along the line 5—5 of Fig. 1.
Figure 6:
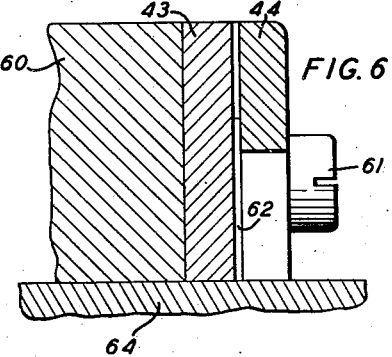
Fig. 6 is an enlarged fragmentary sectional view taken along the line 6—6 of Fig. 1.
Figure 7:
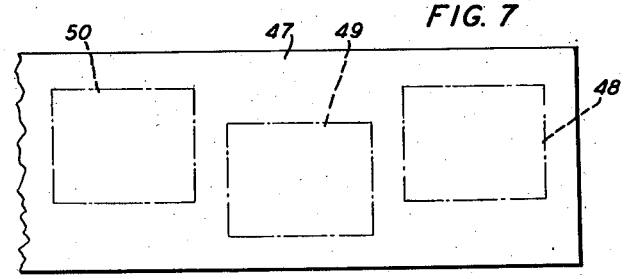
Fig. 7 illustrates a portion of a set of reproduction paper with the outlines of three prints thereon.
Figure 8:
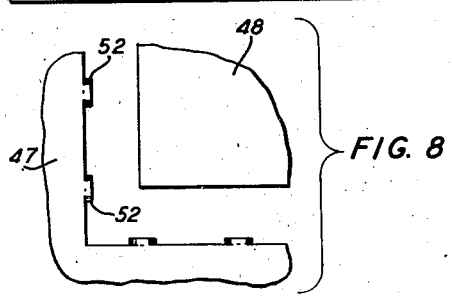
Fig. 8 is a fragmentary detailed view of the material after a portion has been sheared therefrom.

The shearing elements 30 are formed with teeth 40 at their lower portions, these teeth providing inner and outer shearing edges 41 and 42 respectively to cooperate with companion members 43 and 44, particularly the upper shearing edges 45 and 46 thereof (Fig. 5) to shear portions from material. The material in the present illustration is what might be termed blueprint material 47 upon which prints 48, 49 and 50 are made in the conventional manner. The portions referred to as being cut from the material due to the shearing edges 41 and 42 of the elements 30 are illustrated at 52 (Figs. 4 and 8). It is important that this material 52, that is, the sheared portions of the main material 47, be caused to remain upon the scrap portion of the main material and not upon the print sheared therefrom. This is accomplished by machined or interrupted portions 54 removing or cutting away the outer shearing edges 42 near the vertices thereof leaving only the complete shearing edges 41 to cooperate with the inner shearing edges 46 of the members 43 to complete the shearing of the portions 52 causing them to remain on the scrap material. There are also cutting edges 55 at the lower ends of the teeth to cut the material to form the separate portions 52.

The members 43 and 44 are secured to a table 60, through the aid of machine screws 61, and are spaced from each other a given distance, which is approximately the thickness of the shearing elements 30, through the aid of spacers 62 mounted adjacent the screws 61. The table 60 is mounted upon a support 64, which in turn is mounted upon the base 10. The support 64 has integral lugs 65 apertured to receive guide rods 66, the latter being disposed at parallel spaced positions as illustrated in Fig. 2. The guide rods 66 function in cooperation with integral arms 67 to assure registration of the shearing elements 30 with the openings between the members 43 and 44. The integral arms 67 are fixed to the head 26 through the aid of screws 68 and have bushings 69 in their outer ends to ride upon the rods 66 during the reciprocal movement of the head and its associated structure.

Upon considering the operation of the apparatus, let it be assumed that a strip of the material 47 containing the prints 48, 49, 50 and others, is to be fed to the apparatus manually. As illustrated in Figs. 1 and 2, the material 47 is allowed to rest upon the table 60 and is located so that the area including the print 48 is accurately positioned beneath the shearing elements 30. The operator may then move the lever 24 downwardly against the force of the spring 16 causing the ram 14 to move in its bearing 12.

The material is first gripped by the stripping plate 33 and the table 60, assuring against displacement of the material during the shearing operation. The moment the material is gripped, the shearing elements, during the continued downward movement of the lever, will begin the simultaneous shearing of the portion 48 from the material 47. The shearing action takes place at the multiplicity of teeth of the elements which completely surround the area to be sheared. Furthermore, a multiplicity of small portions 52 will be sheared almost, but not completely from the material 47, their severance from the print 48 being complete by the continuation of the shearing edges 41 cooperating with the shearing edges 45.

During the downward movement of the shearing elements, they are accurately aligned with the spaces to receive them through the aid of the bushings 69 of the arm 67 riding upon the rods 66.

After the first cut has been made, the operator may allow the lever 15 to be moved through the action of the spring 16 to return the head 26 to its normal position, the stripper plate 33 functioning to strip the sheared print 48 from the shearing elements 30. This sheared print may be removed and the material again adjusted for the shearing of the print 49.

Figure 9:
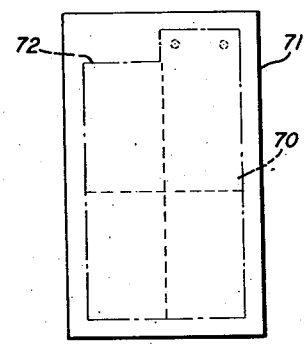
Fig. 9 illustrates a print of a different contour which could be sheared through a modification of the shearing apparatus.

It should be understood that, although in the present embodiment the print severed is of a rectangular contour, this contour may be varied to conform to various prints or other structures to be severed from material, one illustration of which is given in Fig. 9. In this illustration, the print 70, which is to be sheared from the material 71, is rectangular in general, excepting at one corner which is cut away as indicated at 72. In this instance, instead of having four shearing elements and companion cutting members to surround a truly rectangular figure, six shearing elements and equal sets of shearing members would be required to completely surround the print 70 and shear it from the material 71.

Although specific improvements of the invention have been shown and described, it will be understood that they are but illustrative and that various modifications may be made therein without departing from the scope and spirit of this invention as defined by the appended claims.

What is claimed is:

1. A shearing apparatus comprising companion shearing members having shearing edges, and a shearing element, having one shearing edge to cooperate with the shearing edge of its respective member to cut through a material the full lengths thereof, and another shearing edge with an interrupted portion to coperate with the shearing edge of the other member to cut through the material for only portions of their lengths.

2. A shearing apparatus comprising companion shearing members having spaced shearing edges, and a shearing element having a serrated surface forming shearing edges to pair with the shearing edges of their respective members, to shear through a material, one of the shearing edges of the element having portions removed therefrom, whereby only spaced portions of the material will be sheared thereby.

3. A shearing apparatus comprising companion shearing members having spaced shearing edges, and a shearing element having a serrated surface forming lateral cutting edges at the outermost portions thereof, a shearing edge cooperating with the shearing edge of its respective member to shear through a material and a series of shearing edges terminating short of vertices of the serrated surface to cooperate with the shearing edge of the other member to shear through spaced portions of the material.

4. A shearing apparatus comprising companion shearing members having spaced shearing edges, and a shearing element having a serrated surface, forming longitudinal shearing edges cooperating with their respective edges of the members to shear a portion from a material, and forming lateral cutting edges to cut the said portion into a plurality of parts, one of the shearing edges of the element having interrupted portions to leave the parts integral with one portion of the material.

WALTER B. SHEAR.